United States Patent [19]

Schuwerk

[11] 4,320,937
[45] Mar. 23, 1982

[54] ROTATABLE MOTOR VEHICLE MIRROR

[76] Inventor: Fritz Schuwerk, Jutastrasse 26, 8000 Munchen 2, Fed. Rep. of Germany

[21] Appl. No.: 116,788

[22] Filed: Jan. 30, 1980

[30] Foreign Application Priority Data

Feb. 8, 1979 [DE] Fed. Rep. of Germany ....... 2904825

[51] Int. Cl.³ .......................... G02B 5/08; G02B 7/18; B60R 1/06
[52] U.S. Cl. ................................................... 350/62
[58] Field of Search ............ 350/62, 289, 307, 61–63; 277/DIG. 5; 248/358

[56] References Cited

U.S. PATENT DOCUMENTS

| | | | |
|---|---|---|---|
| 3,712,703 | 1/1973 | Newdigate | 350/62 |
| 3,942,863 | 3/1976 | Schuwerk | 350/62 |
| 4,167,243 | 9/1979 | Jackson | 277/DIG. 5 |

FOREIGN PATENT DOCUMENTS 712256  8/1966  Italy ..................................... 350/62

*Primary Examiner*—Jon W. Henry
*Attorney, Agent, or Firm*—Daley & Brandt

[57] ABSTRACT

A rotatable mirror for a motor vehicle which embodies a rotor structure having passages which produce an aspirated air flow to cool the rotatable structure and supply heat transferred to the air for maintaining air surface clear of moisture.

4 Claims, 8 Drawing Figures

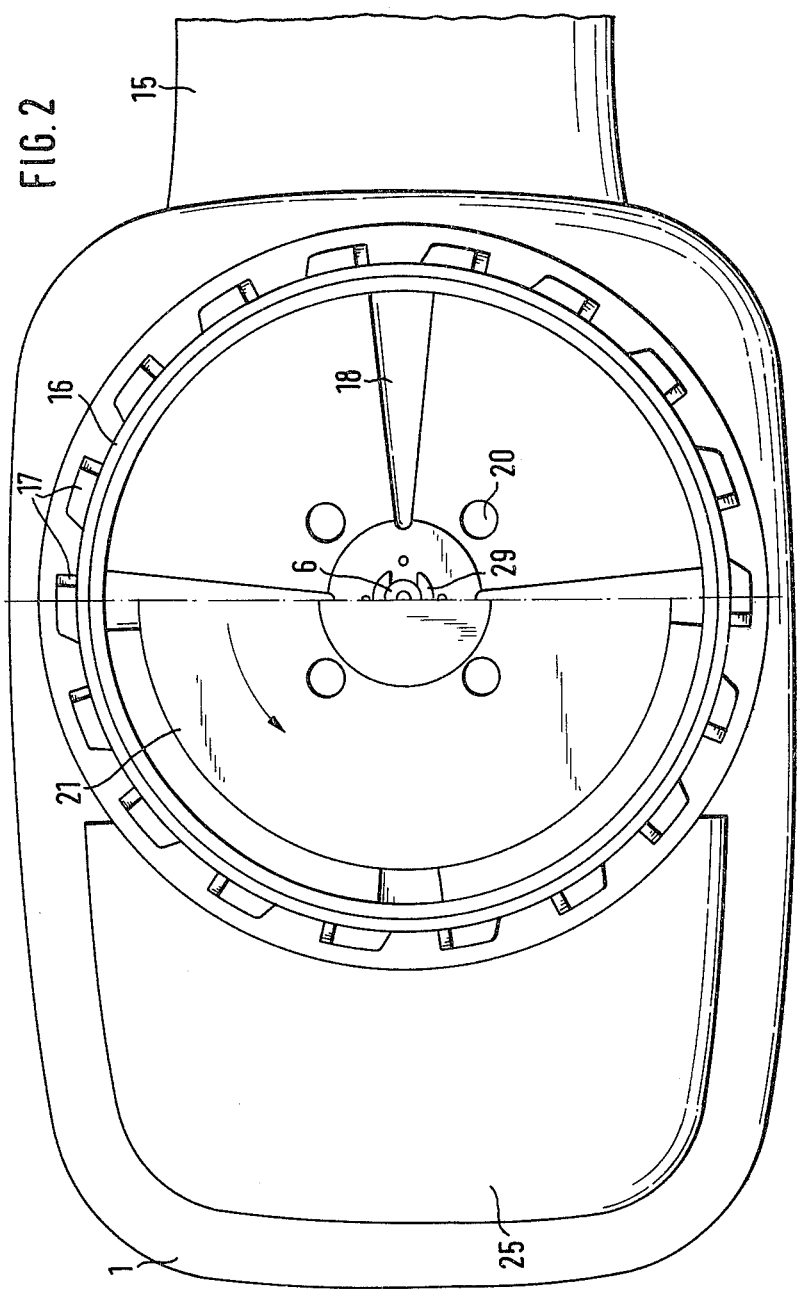

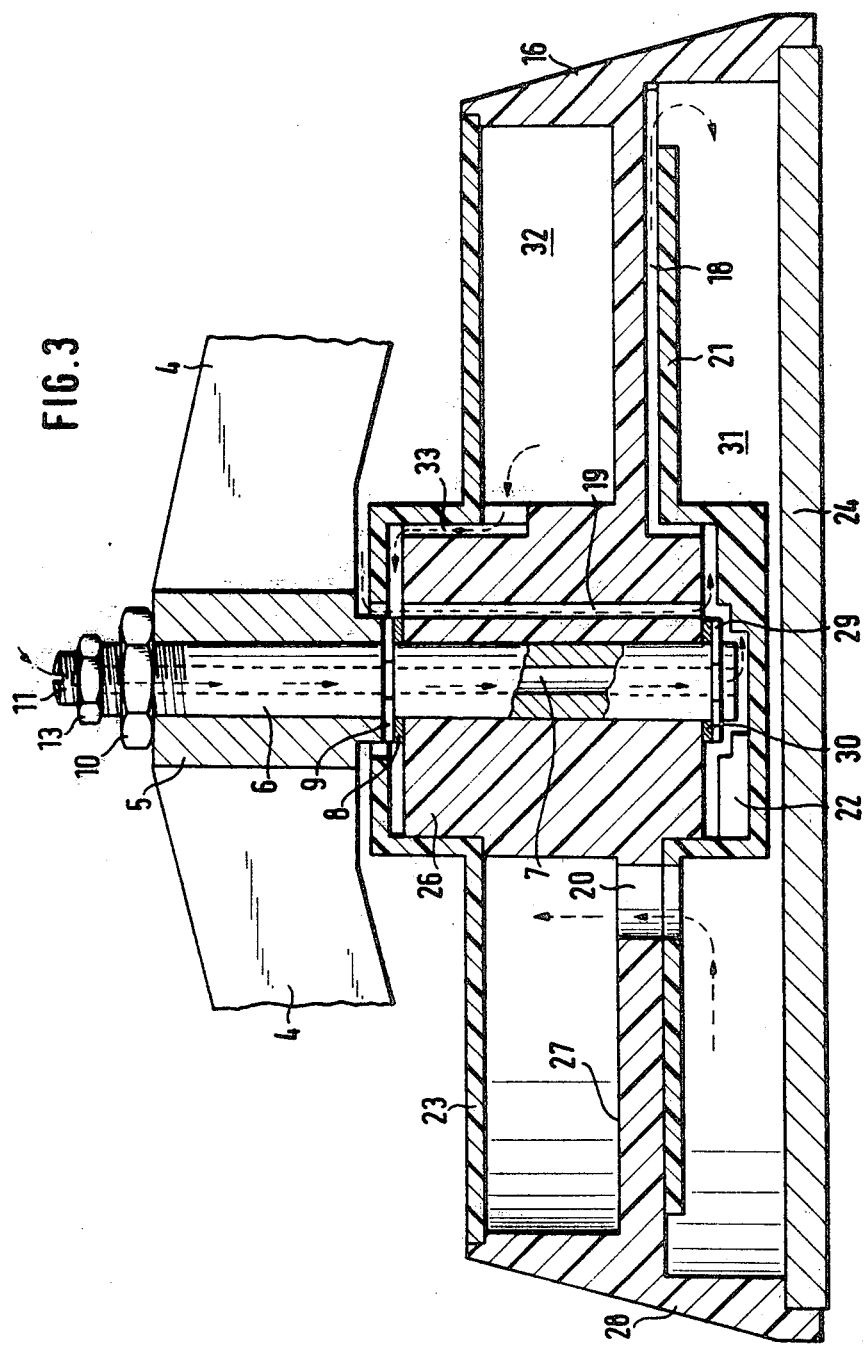

ROTATABLE MOTOR VEHICLE MIRROR

BACKGROUND AND SUMMARY OF THE INVENTION

The invention relates to a rotatable motor vehicle mirror of a type, e.g., depicted and described in German Patent application (OS) No. 2,415,407 counterpart to U.S. Pat. No. 3,942,863.

The rotatable motor vehicle mirror type noted above has suction passages in the form of air guiding grooves in the bordering region between the shaft and the inside of the rotor bearing bore. Although the resulting air bearing and the air flow aspirated by the fan through the air guiding groove dissipates the bearing heat produced by friction and utilizes it to heat up the mirror, the bearing may overheat at high vehicle speeds or high speeds of rotor rotation. This risk can be largely excluded by the use of suitable materials for the bearing, but this in turn increases the manufacturing costs, particularly on account of the installation of bearing sleeves.

It is the object of the present invention to provide a rotatable mirror for motor vehicles which, despite simple construction of the rotor bearing, largely permits the utilization of the bearing heat to heat up the mirror, and which causes little noise during operation.

The advantages attainable by the invention especially reside in the fact that the relatively high resistance offered by the suction passageways to the oncoming air causes subatmospheric pressure at their outlet ends which aspirates additional air through the bearing clearance so that an air cushion builds up in the bearing clearance which results in low-friction and low-noise operation of the rotor. Owing to this air cushion, there is no need to use expensive bearing materials, and a plastic bearing may be employed. At the same time the air flow in the bearing clearance dissipates a substantial portion of the generated bearing heat at the place where it develops. In addition, a plurality of suction bores provided a small distance from the bearing bore contribute to the uniform dissipation of the bearing heat. Furthermore, the characterized inclined position of the blades prevents the development of noise.

BRIEF DESCRIPTION OF THE DRAWINGS

Exemplary embodiments of the invention will now be explained with reference to the accompanying drawings in which:

FIG. 2 shows the motor vehicle mirror of FIG. 1 as viewed in forward direction and partially in section perpendicular to the forward direction;

FIG. 3 shows the rotor and the shaft of the motor vehicle mirror of FIG. 1 in longitudinal section on an enlarged 2:1 scale size with the section halves each offset by 45°;

DESCRIPTION OF THE PREFERRED EMBODIMENTS

Figure 1:
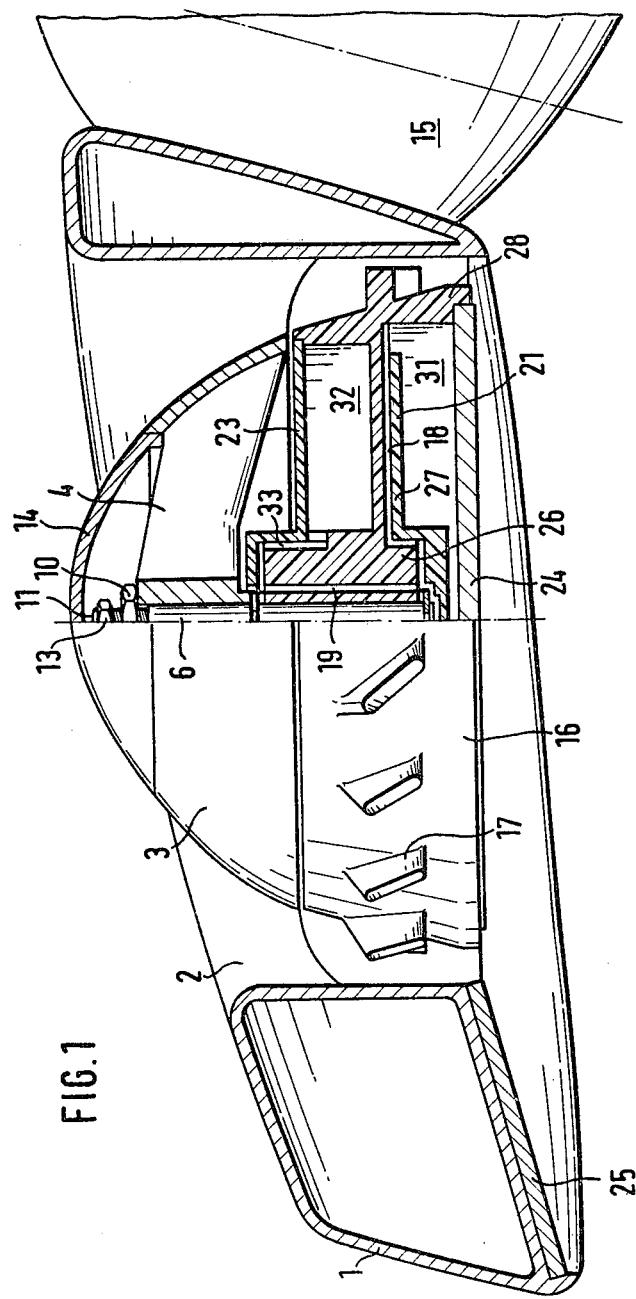
FIG. 1 is a horizontal view partly in section through one embodiment of the motor vehicle mirror, the mirror being in full size.
Figure 5:
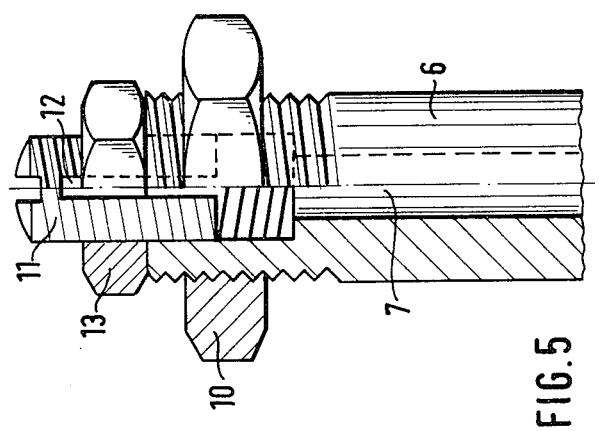
FIG. 5 shows details of the air access regulating means on a 5:1 scale.
Figure 4:
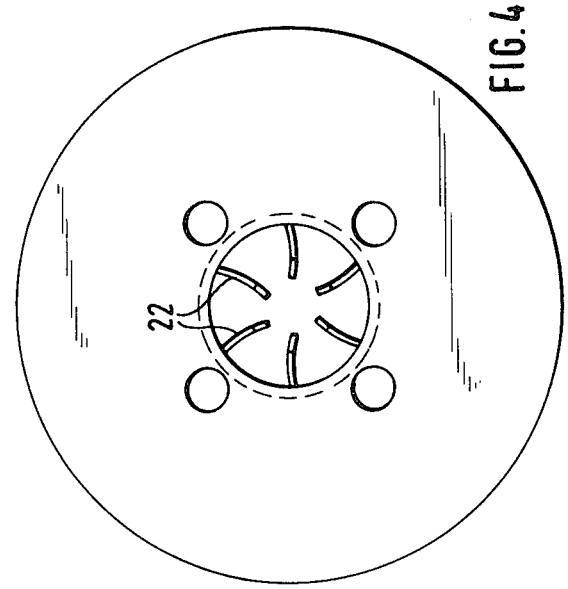
FIG. 4 shows the rotor cover from inside and in full size.

The motor vehicle mirror illustrated in the drawing is mounted on the vehicle by means of a base portion 15. The base portion 15 carries a housing 1 on which an air directing cone 3 is mounted being carried on the housing by ribs 2. In the air directing cone 3 there is received a rotor 16 holding the mirror 24. The rotor 16 rotates on a shaft 6 journalled in a shaft bearing 5 (FIG. 3) which, in turn, is secured in the interior of the housing by ribs 4. The shaft 6 is secured in the shaft bearing by a nut 10 at the forward shaft end, i.e., pointing into the direction of vehicle movement and by a shim 8 and a grooved ring 9 at its rearward end. The rotor 16 may be secured to the shaft by a nut or, as shown in FIG. 3, by a further grooved ring 29 and a shim 30. The shaft 6 may be made from any suitable material, e.g., drawn, polished, or ground tool steel. The rotor 16 consists of a hub 26 carrying a rotor disk 27 to which in turn, a rotor ring 28 with air vanes 17 is mounted. The rotor hub 26 is of relatively great length and may extend beyond the rotor ring 28 in the forward direction. The rotor is balanced and preferably its center of gravity is located in the central region of the rotor hub 26. This prevents the rotor from producing resonance vibrations at certain speeds, in which case the mirror would not reflect a clear image. The rotor should suitably be fabricated from a material having high mechanical strength, stiffness, and dimensional stability when heated, e.g., from a polyamide-6, e.g., Ultramid B4.

The bearing clearance between rotor 16 and shaft 6 corresponds to standards and is 0.01 mm with a shaft diameter of 6 mm, as shown in the drawing. In general, a bearing sleeve for the rotor is not necessary. Lubricity is provided exclusively by presence of an air cushion in the bearing clearance. For bearing heat dissipation the rotor hub 26 is provided with a plurality of narrow suction bores 19 of about 1 mm diameter. The drawing indicates use of four such suction bores 19. The suction bores 19 and the bearing clearance communicate with centrifugal passageways 18 leading from the bearing bore outwardly. These centrifugal passageways 18 perform the function of a centrifugal fan. Air is forced outwardly through said passageways by centrifugal force. The centrifugal passageways 18 aspirate air through the suction bores 19. The diameter, the length and the number of suction bores 19, as compared with the number and the cross section of the centrifugal passageways 18, are dimensioned such that there is a relatively high pressure drop in said passageways, i.e., at their outlet ends communicating with the inner ends of the centrifugal passageways 18, there is a zone of subatmospheric pressure. This subatmospheric pressure aspirates additional air through the bearing clearance producing an air cushion between shaft 6 and rotor 16. This air cushion ensures low-friction and low-noise operation of the rotor. The air flow through the bearing clearance simultaneously dissipates most of the bearing heat. With the above mentioned bearing clearance of 0.01 mm and the above mentioned four suction bores 19 of 1 mm diameter each, and with a length of the rotor hub 26 of about 2.5 cm, centrifugal passageways 18 having a cross section flaring from 1 mm × 2.5 mm at the inner end to 1 mm × 10 mm at the outer end have proved to be useful. At the inner ends, the centrifugal passageways open into a closed space into which also the suction bores 19 end and which communicates with the bearing clearance. The usual radial and axial play and the open region of the grooved ring 29 are sufficient to allow air to enter from the bearing clearance into the closed space.

In the embodiment illustrated in the drawings, the centrifugal passageways 18 are straight grooves formed in the rotor and closed on the side facing the mirror by a circular cover 21. The centrifugal passageways may also have a curved configuration. The cover 21 with its depressed central portion simultaneously surrounds the rotor hub 26 thereby defining the above mentioned space. The air exits from the centrifugal passageways at the outer ends thereof and flows into a first chamber 31 formed between the cover 21 and the back side of the mirror 24 and confined on its outer periphery by the rotor ring 28. Alternatively, the cover 21 may consist merely of a pot-like center portion with covering strips fanning out from said portion and covering only the centrifugal passageways 18, rather than the entire rotor.

The air is heated by the heat absorbed in the bearing clearance and in the suction bores 19 and transfers heat to the back of the mirror 24 thereby eliminating any haze formed on the mirror due to high air humidity and low temperature. From said first chamber the air flows through air passages 20 into a second chamber 32 located at the other side of the rotor disk 27 facing away from the mirror whence the air is again aspirated through the suction bores 19 and partially through the bearing clearance. The air passages 20 are located near the rotor hub 26 in order to cause the air to flow through the entire first chamber 31 and to uniformly heat up the mirror 24. The second chamber 32, in the embodiment illustrated in the drawing, is confined by the rotor disk 27, by a wall 23 disposed parallel to the rotor disk, and around the inner and the outer peripheries by the rotor hub 26 and a portion of the rotor ring 28, respectively. The wall 23 has a central opening for the shaft 6 and the shaft bearing 5, respectively, leaving a narrow annular opening to permit exchange of air.

Since in the embodiment shown in the drawing the rotor hub 26 extends beyond the rotor ring 28, air conducting passages 33 are formed at the forward end of the rotor hub to communicate the second chamber 32 with the forward end of the suction bores 19 and the bearing clearance.

For more effective cooling of the bearing the shaft 6 is preferably provided with a bore 7 opening with its end disposed near the mirror into the centrifugal passageways 18 or the space surrounded by the cover 21. At its forward end pointing into the direction of vehicle movement, the shaft is provided with an air access regulating means consisting of an adjusting screw 11 with a slot 12 and of a lock nut 13 for the adjusting screw 11. The access of air can be increased or decreased by loosening or tightening the adjusting screw 11 to thereby control the temperature to which the rotor bearing heats up. In order to increase the efficiency of the fan in accordance with the amount of air additionally supplied through the bore 7, the inside of the cover in the space formed on the mirror-side end of the rotor hub 26 is provided with vanes 22 which, like the centrifugal passageways, act as a centrifugal fan and assist the action of the centrifugal passageways 18. The vanes 22 are preferably curved as conventional for centrifugal fans so that the inertia of the air assists the centrifugal force in forcing the air outwardly.

Figure 6A:
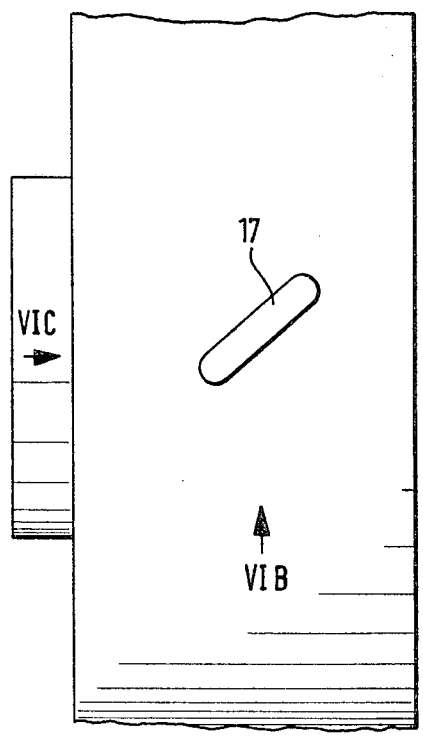
FIGS. 6a, 6b and 6c show details of the rotor blades.
Figure 6B:
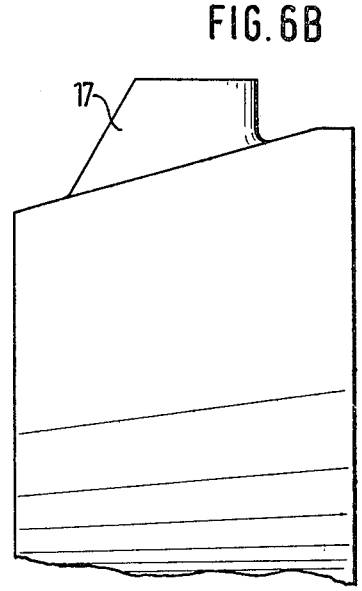
Figure 6C:
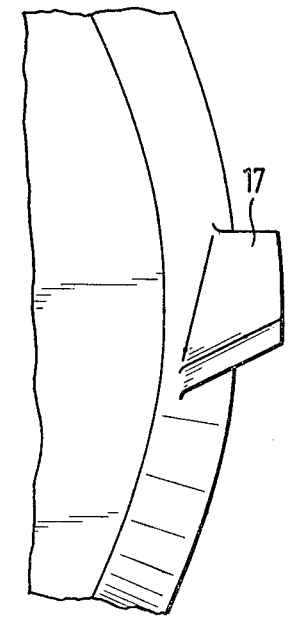

The rotor 16, and thus the centrifugal fan, is driven by the inclined blades 17 provided outside on the rotor ring 28. In order to ensure low-noise operation and to exclude the risk of rotor overspeed, the shape and the arrangement of the blades must be adjusted to the output of the centrifugal fan, i.e., to the cross section and the length of the centrifugal passageways 18 and of the suction bores 19 and the bearing clearance and optionally the bore 7. In the preferred embodiment of the invention illustrated in the drawing eighteen blades 17 equidistantly spaced around the outside of the rotor ring 28 have proved to be the optimum solution. As shown in FIG. 6a, the blades 17 are positioned at an angle of 40° with respect to the direction of vehicle movement. The leading edge of the blades is inclined rearwardly at an angle of 30°, i.e., opposite to the direction of vehicle movement, and the rotor ring 28 tapers in forward direction at an angle of 14°. The vanes 22 are arranged at a distance of 8 mm from the rear edge of the rotor ring 28. The maximum diameter of the rotor ring is 104.5 mm, and the external ends of the blades 17 describe a circle of 112 mm diameter. The thickness of the blades is 2.4 mm. They have rounded edges. The housing 1 surrounds the air directing cone 3 and the rotor 16 with a cylindrical outer surface having an inner diameter of about 116 mm so that the blades 17 are spaced from the housing a distance of about 2 mm.

The embodiment of the invention illustrated in the drawing and discussed above not only permits a substantially noiseless operation even at high speeds of the vehicle but also prevents rotor overspeeding. With the above mentioned dimensions of the centrifugal fan and the suction bores 19 and the bearing clearance and optionally of the bore 7, the fan consumes so much energy that the maximum rotor speed is limited to about 5200 min$^{-1}$. On the other hand, the rotor is caused to rotate already at relatively low vehicle speeds of about 12 to 15 km/h.

Preferably a stationary mirror 25 is mounted at the end of the housing 1 remote from the vehicle to cover any blind angle.

What is claimed is:

1. A rotatable motor vehicle mirror comprising a rotor structure supported on a shaft, said structure having a bore passage receiving said shaft and carrying a mirror at one end thereof, a plurality of suction bores passing through the rotor structure adjacent said shaft and having inlet and outlet ends disposed on the axially opposed sides of said rotor, and a fan unit disposed adjacent the outlet ends of said bore passages for aspirating air from said suction bores and passing it to the rear side of the mirror, said suction bores offering relatively high resistance to the aspirated air flow so that subatmospheric pressure is produced at the outlet ends of the suction bores, there being bearing clearance between the shaft and rotor structure such that the presence of subatmospheric pressure at the outlet ends of such bores produces an aspirated air flow cushion between the shaft and rotor bore passage, said rotor shaft having an axial bore passing end-to-end thereof for communicating additional air flow to said fan unit, and adjustable air access regulating means carried on the other end of said shaft for controlling the amount of additional air flowing through said shaft bore.

2. The rotatable motor vehicle mirror of claim 1 in which the adjustable air access regulating means comprises a set screw received in said one end of said shaft and having an air access slot therein which is in communication with said shaft bore, and a lock nut encircling said set screw, relative rotative movement between said set screw and lock nut correspondingly altering the effective access opening size of said access slot.

3. The rotatable motor vehicle mirror of claim 1 further comprising a second fan unit disposed in the vicinity of the outlets of said suction bores and operable upon rotation of said rotor structure to supplement air flow through the first fan unit.

4. A rotatable motor vehicle mirror according to claim 1 in which the fan unit is driven by inclined blades distributed around the rotor periphery, the outer periphery of the rotor tapering at an angle of 14° in the direction of vehicle travel, the maximum diameter of the rotor being about 104.5 mm, the outer ends of the blades describing a circle having a diameter of about 112 mm, the blades being inclined at an angle of 40° with respect to the rotor axis, the front edges of the blades being inclined backwards at an angle of 30°, the blades having a length of about 12 mm at their external ends and being spaced a distance of about 8 mm from the rear edge of the rotor, and there being a housing surrounding the rotor with a cylindrical surface and spaced from the blade tips a distance of about 2 mm.

* * * * *